April 7, 1964    E. J. RADENBERG    3,127,968
SAFETY OVERLOAD CLUTCH
Filed Nov. 8, 1961    2 Sheets-Sheet 1
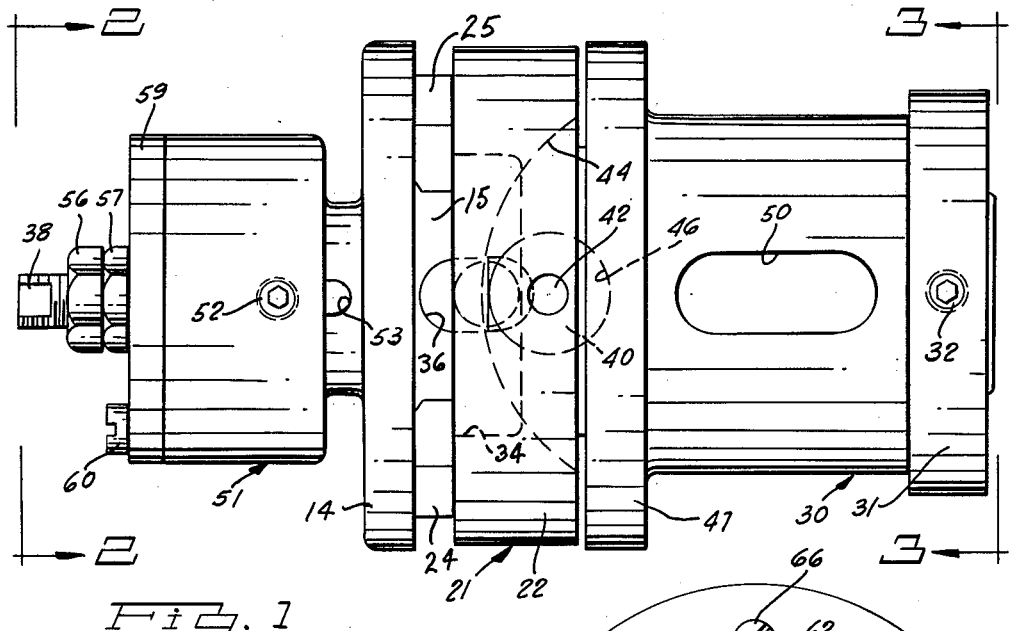
Fig. 1
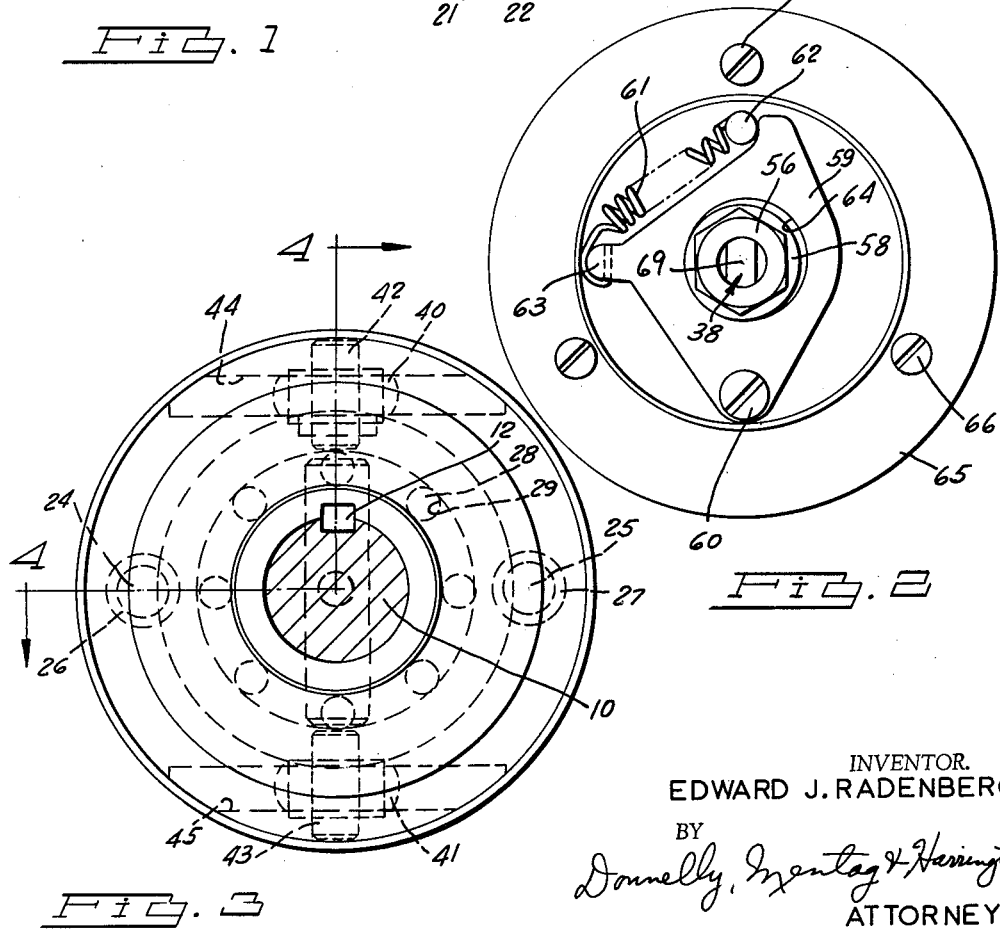
Fig. 2
Fig. 3
INVENTOR.
EDWARD J. RADENBERG
BY
Donnelly, Mentag & Harrington
ATTORNEYS

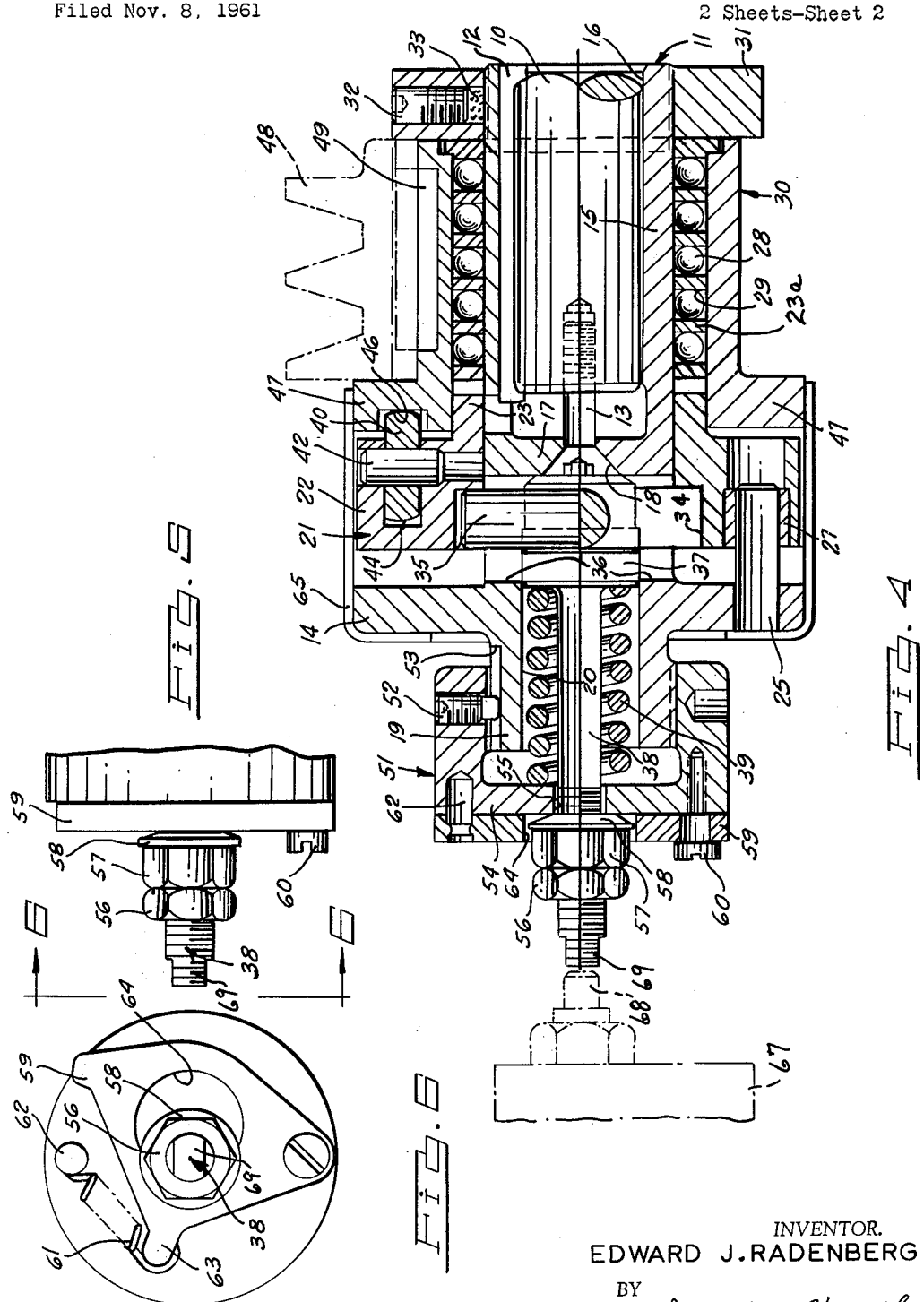

United States Patent Office 3,127,968
Patented Apr. 7, 1964

3,127,968
SAFETY OVERLOAD CLUTCH
Edward J. Radenberg, Oakland, Mich.
(17611 Ramsgate, Lathrop Village, Mich.)
Filed Nov. 8, 1961, Ser. No. 151,070
5 Claims. (Cl. 192—56)

This invention relates generally to overload drive devices, and, more particularly, to a novel and improved safety overload clutch which is adapted to automatically disengage a driving member of the clutch from a driven member when an overload is encountered to prevent injury to a machine or other unit which is operatively connected by the clutch to a power source.

It is an important object of the present invention to provide a safety overload clutch which includes a driving member having a driven member rotatably carried thereon, a carrier member non-rotatably slidably mounted on said driving member and which is provided with a plurality of rollers mounted thereon for driving engagement in a plurality of slots formed on the driven member, and which clutch further includes a biasing means carried on the driving member for normally urging the carrier member towards the driven member so as to engage said rollers in said slots to form a driving connection between said driving and said driven members during normal load conditions and whereby when an overload condition is encountered said rollers will ride out of said slots to disengage the driving member from the driven member.

It is another object of the present invention to provide a novel safety overload clutch which incorporates a novel roller means for a driving engagement between a driving and driven member and which clutch is further provided with a novel means for locking the driving member in a disengaged position from the driven member when an overload condition is operative to disengage the driving and driven members.

It is still another object of the present invention to provide a safety overload clutch of the class described which is simple and compact in construction, economical of manufacture and efficient in operation.

Other objects, features and advantages of this invention will be apparent from the following detailed description and appended claims, reference being had to the accompanying drawings forming a part of the specification wherein like reference numerals designate corresponding parts of the several views.

In the drawings:

FIG. 1 is a top plan view, with the dust cover removed, of a safety overload clutch embodying the principles of the present invention;

FIG. 2 is a left-end elevational view of the structure illustrated in FIG. 1, taken along the line 2—2 thereof and looking in the direction of the arrows;

FIG. 3 is a right-end elevational view of the structure illustrated in FIG. 1, taken along the line 3—3 thereof and looking in the direction of the arrows;

FIG. 4 is a partial longitudinal vertical sectional view and a partial horizontal sectional view of the structure illustrated in FIG. 3, taken along the line 4—4 thereof, and looking in the direction of the arrows;

FIG. 5 is a fragmentary view of the left end of the overload safety clutch and showing the lock out latch in an inoperative position; and, FIG. 6 is a left-end elevational view of the structure illustrated in FIG. 5, taken along the line 6—6 thereof, and looking in the direction of the arrows.

Referring now to the drawings, and in particular to FIGS. 1 and 4, the numeral 10 illustrates a drive shaft of a drive motor or the like, which is adapted to be connected to the driving member generally indicated by the numeral 11, by any suitable means, as by the conventional lock key 12 and the screw 13. It will be seen that the driving member 11 comprises the flange portion 14 and the integral forwardly extended sleeve portion 15. The sleeve portion 15 is provided with the bore 16 in which the shaft 10 is operatively mounted. The inner end wall 17 is provided with a suitable hole 18 through which the screw 13 is mounted. As shown in FIG. 4 the driving member 11 further includes the rearwardly extended sleeve or hub 19 which is provided with the inwardly extended bore 20 which extends inwardly to the wall 17.

As shown in FIGS. 1 and 4, a drive roller carrier is non-rotatably slidably carried on the sleeve or hub 15 of the driving member 11 and is generally indicated by the numeral 21. The carrier member 21 includes the outwardly extended circular flange 22 and the forwardly extended sleeve 23 which is slidably mounted on the driving member sleeve 15. As shown in FIGS. 3 and 4, the driving flange 14 is connected to the carrier flange 22 by means of a plurality of driving pins as the two driving pins 24 and 25 which are slidably mounted in the bushings 26 and 27, respectively, in the carrier flange 22. It will be seen that the carrier flange 22 may be moved forwardly and backwardly relative to the driving member flange 14 but the carrier will not rotate relative to the driving member due to the non-rotative connection of the driving pins.

As shown in FIGS. 3 and 4, an annular sleeve 23a is provided with a plurality of radially disposed ball bearings 28 which are operatively mounted in the recesses 29 formed in the sleeve 23a. The ball bearings 28 are adapted to ride on the outer periphery of the guiding member sleeve 15. As shown in FIG. 4, a driven member generally indicated by the numeral 30 is rotatably mounted on the outwardly extended ball bearing sleeve 23a and is held in place thereon against forward axial or longitudinal movement by means of the collar 31 which is threadably mounted on the forward end of the driven member sleeve 15. The collar 31 is locked in radial position by means of the set screw 32. A copper disc 33 is disposed under the screw 32 and engages the threads on the sleeve 15 to prevent injury to the same.

As shown in FIGS. 3 and 4 the carrier flange 22 is provided on the rear face thereof with a circular recess 34 in which is seated the pressure pin 35. The pressure pin 35 is adapted to be further seated in the vertical elongated slot 36 formed in the driving member sleeve 15 adjacent the flange 14. A spring 39 is operatively mounted around the plunger rod 38 and has the forward end thereof disposed in engagement with the outer face of the enlarged plunger rod head 37. The spring 39 maintains an inwardly bias or urging force on the plunger head 37 which in turn urges the pressure pin 35 inwardly and which pin 35 further in turn urges the carrier 21 to the right as viewed in FIG. 4.

As shown in FIGS. 3 and 4, the carrier 21 is provided with a pair of drive rollers 40 and 41 which are operatively journalled on the vertical shafts 42 and 43 respectively. The rollers 40 and 41 are seated in the arcuate recesses 44 and 45 which are formed in the forward sides of the carrier flange 22. The rollers 40 and 41 are adapted to extend outwardly forwardly and to be drivingly engaged in the arcuate slots 46 formed in the rearward vertical face of the flange 47 which is formed on the rear end of the driven member 30. It will be seen that when the rollers 40 and 41 engage in the slots 46 the driving member 11 will be operatively engaged with the driven member 30 for driving the same. Any suitable driving member may be mounted on the driven member 30 for transmitting the drive to some other object, as for example a belt pulley as indicated by the dotted outline of the same in FIG. 4 and marked by the numeral 48. The pulley 48 may be mounted on the driven member 30 by any suitable means as by a conventional lock key 49 which may be mounted in the key slot 50.

As shown in FIGS. 1 and 4, a spring adjusting nut 51 is threadably mounted on the outer end of the driving member rear sleeve 19 and is held in any desired locked position by means of the set screw 52, which engages in the slot 53. The nut 51 is provided with the outer end wall 54 which has the axial hole 55 through which passes the plunger rod 38. It will be seen that the pressure of the spring 39 is adjustable by means of the nut 51. It will also be seen that the spring 39 urges the plunger head 37 and the drive pin 35 against the carrier 21 to maintain the rollers 40 and 41 in driving engagement in the slots 46 on the driven member flange 47.

The clutch of the present invention is provided with an automatic lock-out mechanism which is operatively mounted on the outer end of the adjusting nut 51 and the plunger rod 38. As shown in FIG. 4 a pair of lock nuts 56 and 57 are mounted on the outer end of the plunger rod 38 and they are mounted on the plunger rod 38 outwardly of the wall 54 and maintain the lock-out latch disc washer 58 against the wall 54. FIG. 6 shows the lock-out latch 59 swung to a position wherein it is engaged between the lockout washer 58 and the wall 54 so as to hold the plunger in a position moved to the left of the position shown in FIG. 4 whereby the driving member 14 will be maintained in disengaged position from the driven member 30. The lock-out latch 59 is pivotally mounted by means of the screw 60 on the outer face of the wall 54 and it is given a normal counter clockwise bias, as viewed in FIG. 6, by means of the spring 61. The spring 61 is anchored by means of the pin 62 at a position diametrically opposite to the screw 60 and the other end of the spring 61 is connected to the arm 63 of the lock-out latch 59. As shown in FIG. 2 the lock-out latch 59 is provided with a centrally disposed hole 64 which, when the device is in the operative position, will encircle the washer 58 to permit the plunger rod 38 to be moved inwardly. It will be seen that when the plunger rod 38 is moved to the left as viewed in FIG. 4, by means of an overload whereby the rollers 40 ride out of the slots 46 the plunger rod 38 will be moved to the left permitting the spring 61 to rotate the lock-out latch 59 under the washer 58 to the position viewed in FIG. 6. As shown in FIG. 4 the clutch is provided with a dust cover 65 which is held in place by any suitable means, as by means of the screws 66, as shown in FIG. 2.

In operation the clutch of the present invention may be put into use wherein the power input is through the shaft 10 whereby the member 11 is the driving member, and the member 30 is the driven member. The spring 39 normally biases the plunger rod, the drive pin 35, and the carrier 21 to the right as viewed in FIG. 4, so as to maintain the rollers 40 and 41 in the slots 46 on the driving member 30. When an overload occurs, the rollers 40 and 41 will be moved out of the slots 46 and the carrier 21 will move backwardly or to the left as viewed in FIG. 4. The plunger rod 38 will also be moved backwardly or to the left as viewed in FIG. 4 and the lock-out latch 59 will be swung to the position shown in FIG. 6 to automatically lock out the driving connection means in the clutch. It will be seen that the swith 67 having the operating button 68 may be engaged by the end 69 of the plunger rod 38, when the plunger rod 38 moves to the left as viewed in FIG. 4 for operating a cut-off control circuit or for operating an alarm or signal light or other means in a machine set-up. The tension of the spring 61 permits the latch 59 to move under the nut 57 and maintain a steady lock-out until such time as the overload danger is corrected. An advantage of the structure of the present invention is that it has a double adjustment of the pressure of the rollers 40 and 41 in the bottom of the drive slots 46 and this is accomplished by means of the lock nuts 56 and 57 and the lock nut 51. The nut 51 is used for setting the spring pressure of spring 39. The lock nuts 56 and 57 can be adjusted to offset the spring pressure of rollers 40 on the bottoms of the slots 46 and allow for a slight clearance therebetween. The edges of the rollers 40 and 41 are also provided with a crown to permit efficient roll-out action of the rollers from the slots 46. The roller drive construction of the present invention permits the same to be mounted on the main drive member and decrease longitudinal friction in the device. The friction in the device is also overcome by the fact that the rollers 40 and 41 will go out of the slots 46 at the time of an overload much more freely than do prior art devices employing other drive connection means, as for example, keys or engaging teeth of driving and driven members.

The device of the present invention provides an overload safety clutch which is adapted to operate and carry out its function with an efficient drive structure which is designed to involve a minimum of friction between the operating parts.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What I claim is:

1. In a safety overload clutch, the combination comprising:
   (a) a driving member,
   (b) a driven member rotatably mounted on said driving member,
   (c) a carrier member non-rotatively axially slidably mounted on said driving member for movement toward and away from said driven member;
   (d) a plurality of spaced, radially disposed rollers mounted on one end of said carrier member and facing said driven member,
   (e) said driven member being provided with a plurality of radially disposed slots aligned with said rollers for the reception of said rollers for a driving coupling connection therewith,
   (f) biasing means carried by said driving member for normally urging said carrier member towards said driven member to engage said rollers in said slots to form a driving connection between said driving and said driven members,
   (g) means for locking the carrier member in a position disengaged from said driven member when an overload is impressed on the clutch so as to cause the rollers to be moved out of driving engagement with said slots,
   (h) an axially disposed plunger mounted within said driven member, coaxially with said carrier member, and being provided with an enlarged head and a transverse hole on the inner end thereof,
   (i) said carrier member being provided with a circular recess on the other side thereof opposite to the side facing the driven member, and said driving member having a transverse slot elongated axially of said driven member and aligned with the transverse hole in said plunger,
   (j) a pressure pin mounted in the transverse hole in the inner end of said plunger and said elongated slot and being disposed in said recess in said carrier member, and
   (k) said biasing means engaging the enlarged head on said plunger for normally biasing said plunger and pressure pin toward said carrier member to engage the same and urge the carrier member toward said driven member, and said means for locking the carrier member in a position disengaged from the driven a member being adapted to detachably engage said plunger for carrying out said locking operation.

2. In a safety overload clutch, the combination comprising:
(a) a driving member,
(b) a driven member rotatably mounted on said driving member,
(c) a carrier member non-rotatively axially slidably mounted on said driving member for movement toward and away from said driven member;
(d) a plurality of spaced, radially disposed rollers mounted on one end of said carrier member and facing said driven member,
(e) said driven member being provided with a plurality of radially disposed slots aligned with said rollers for the reception of said rollers for a driving coupling connection therewith,
(f) biasing means carried by said driving member for normally urging said carrier member towards said driven member to engage said rollers in said slots to form a driving connection between said driving and said driven members,
(g) means for locking the carrier member in a position disengaged from said driven member when an overload is impressed on the clutch so as to cause the rollers to be moved out of driving engagement with said slots,
(h) means for actuating a cut-out and signal switch when said driving member is disengaged from said driven member,
(i) an axially disposed plunger mounted within said driven member, coaxially with said carrier member, and being provided with an enlarged head and a transverse hole on the inner end thereof,
(j) said carrier member being provided with a circular recess on the other side thereof opposite to the side facing the driven member, and said driving member having a transverse slot elongated axially of said driven member and aligned with the transverse hole in said plunger,
(k) a pressure pin mounted in the transverse hole in the inner end of said plunger and said elongated slot and being disposed in said recess in said carrier member, and
(l) said biasing means engaging the enlarged head on said plunger for normally biasing said plunger and pressure pin toward said carrier member to engage the same and urge the carrier member toward said driven member, and said means for locking the carrier member in a position disengaged from the driven member being adapted to detachably engage said plunger for carrying out said locking operation.

3. In a safety overload clutch, the combination combination comprising:
(a) a driving member having an integral forwardly extended sleeve, an integral rearwardly extended sleeve, and an integral flange disposed between said sleeves,
(b) a carrier member non-rotatably axially slidably mounted on said driving member and having a forwardly extended sleeve slidably mounted on the forwardly extended sleeve of said driving member,
(c) a plurality of driving pins having one end thereof fixed in said flange and the other end thereof slidably mounted in said carrier member for a driving connection therewith,
(d) a driven member rotatably carried on the forwardly extended sleeve of said driving member,
(e) a plurality of rollers mounted on said carrier member,
(f) said driven member being provided with a plurality of slots for the reception of said rollers, and
(g) biasing means carried by said driving member for normally urging said carrier member towards said driven member to engage said rollers in said slots to form a driving connection between said driving and said driven members.

4. In a safety overload clutch, the combination combination comprising:
(a) a driving member having an integral forwardly extended sleeve, an integral rearwardly extended sleeve, and an integral flange disposed between said sleeves,
(b) a carrier member non-rotatably axially slidably mounted on said driving member and having a forwardly extended sleeve slidably mounted on the forwardly extended sleeve of said driving member,
(c) a plurality of driving pins having one end thereof fixed in said flange and the other end thereof slidably mounted in said carrier member for a driving connection therewith,
(d) a driven member rotatably carried on the forwardly extended sleeve of said driving member,
(e) a plurality of rollers mounted on said carrier member,
(f) said driven member being provided with a plurality of slots for the reception of said rollers, and
(g) an axially disposed spring carried in said rearwardly extended sleeve of said driving member for normally urging said carrier member towards said driven member to engage said rollers in said slots to form a driving connection between said driving and said driven members, and,
(h) a spring adjusting nut threadably mounted on said rearwardly extended driving member sleeve for engaging the outer end of said spring for adjusting the pressure of the same.

5. In a safety overload clutch, the combination combination comprising:
(a) a driving member having an integral forwardly extended sleeve, an integral rearwardly extended sleeve, and an integral flange disposed between said sleeves,
(b) a carrier member non-rotatably axially slidably mounted on said driving member and having a forwardly extended sleeve slidably mounted on the forwardly extended sleeve of said driving member,
(c) a plurality of driving pins having one end thereof fixed in said flange and the other end thereof slidably mounted in said carrier member for a driving connection therewith,
(d) a driven member rotatably carried on the forwardly extended sleeve of said driving member,
(e) a plurality of rollers mounted on said carrier member,
(f) said driven member being provided with a plurality of slots for the reception of said rollers,
(g) an axially disposed spring carried in said rearwardly extended sleeve of said driving member for normally urging said carrier member towards said driven member to engage said rollers in said slots to form a driving connection between said driving and said driven members,
(h) a spring adjusting nut threadably mounted on said rearwardly extending driving member sleeve for engaging the outer end of said spring for adjusting the pressure of the same,
(i) an axially disposed plunger mounted within said spring and having the rearward end thereof extended through said spring adjusting nut and rearwardly thereof,
(j) the inner end of said plunger having an enlarged head,
(k) a pressure pin mounted in a drive slot in the carrier member and the enlarged inner head of said plunger engages the drive pin for transmitting the pressure of said spring to said carrier, and
(l) means for locking the plunger in position to relieve the pressure of the spring on the carrier and maintain the carrier member in a position disengaged from the driven member.

(References on following page)

References Cited in the file of this patent

UNITED STATES PATENTS

| | | |
|---|---|---|
| 1,764,936 | Dean | June 17, 1930 |
| 1,883,164 | Vassakos | Oct. 18, 1932 |
| 2,144,769 | Melmer | Jan. 24, 1939 |
| 2,148,481 | Frank | Feb. 28, 1939 |
| 2,209,155 | Fagg | July 23, 1940 |
| 2,576,069 | Hoag et al. | Nov. 20, 1951 |
| 2,667,050 | Klamp | Jan. 26, 1954 |
| 2,778,468 | Babian | Jan. 22, 1957 |
| 2,859,846 | Shappell | Nov. 11, 1958 |